(12) United States Patent
Driskell et al.

(10) Patent No.: US 10,221,530 B2
(45) Date of Patent: Mar. 5, 2019

(54) DIRECTIONAL SURFACE MARKING SAFETY AND GUIDANCE DEVICES AND SYSTEMS

(71) Applicant: Driskell Holdings, LLC, Jacksonville, FL (US)

(72) Inventors: Gregory W. Driskell, St Johns, FL (US); Michael D. Green, Atlantic Beach, FL (US)

(*) Notice: Subject to any disclaimer, the term of this patent is extended or adjusted under 35 U.S.C. 154(b) by 5 days.

(21) Appl. No.: 15/871,962

(22) Filed: Jan. 15, 2018

(65) Prior Publication Data

US 2018/0355564 A1 Dec. 13, 2018

Related U.S. Application Data

(60) Provisional application No. 62/518,112, filed on Jun. 12, 2017.

(51) Int. Cl.

| | | |
|---|---|---|
| *E01F 9/50* | (2016.01) | |
| *B29C 39/02* | (2006.01) | |
| *B29C 43/24* | (2006.01) | |
| *E01F 9/529* | (2016.01) | |
| *E01F 9/524* | (2016.01) | |
| *B29C 37/00* | (2006.01) | |
| *B32B 7/12* | (2006.01) | |

(Continued)

(52) U.S. Cl.
CPC .......... *E01F 9/529* (2016.02); *B29C 37/0025* (2013.01); *B29C 39/02* (2013.01); *B29C 43/24* (2013.01); *B32B 3/30* (2013.01); *B32B 7/12* (2013.01); *E01F 9/524* (2016.02); *B29K 2995/003* (2013.01); *B29L 2031/7232* (2013.01); *B32B 2307/416* (2013.01); *B32B 2590/00* (2013.01)

(58) Field of Classification Search
CPC ... E01F 9/529; E01F 9/524; E01F 9/04; E01F 9/08; E01F 9/07; E01F 9/047; E01F 9/553; E01F 9/578; E01F 13/10; B29C 37/0025; B29C 39/02; B32B 3/30; B32B 7/12
See application file for complete search history.

(56) References Cited

U.S. PATENT DOCUMENTS 1,740,501 A * 12/1929 Eckstrand ............... E01F 9/529
362/153
2,330,808 A * 10/1943 Bingham ............... G08B 5/008
359/547

(Continued)

FOREIGN PATENT DOCUMENTS

EP 2439338 A2 * 4/2012 ............... E01F 9/50

*Primary Examiner* — Abigail A Risic
(74) *Attorney, Agent, or Firm* — Wilson Dutra, PLLC; Camille A. Wilson

(57) ABSTRACT

In some embodiments, a directional surface marking may provide directional messaging to users based on their direction of travel on a base surface, such as a roadway, walkway, or interior flooring, as non-limiting examples. In some aspects, the directional messaging may comprise different colors, text, or symbols, wherein a user may view different directional messaging on a directional surface marking dependent on direction of travel. In some embodiments, directional surface markings may comprise a profile layer, wherein the profile layer may comprise a plurality of profiles, which may allow for an application of directional messaging.

20 Claims, 12 Drawing Sheets

(51) Int. Cl.
  *B32B 3/30* (2006.01)
  *B29L 31/00* (2006.01)

(56) References Cited

U.S. PATENT DOCUMENTS

| | | | | |
|---|---|---|---|---|
| 2,574,090 A * | 11/1951 | Dofsen | ............ | E01C 9/00 369/21 |
| 2,579,467 A * | 12/1951 | Brickman | ............ | E01F 9/578 404/12 |
| 3,319,542 A * | 5/1967 | Bergsnov-Hansen | ............ | E01F 9/553 359/534 |
| 3,355,999 A * | 12/1967 | Rusling | ............ | E01F 9/619 404/12 |
| 3,739,179 A * | 6/1973 | Krekow | ............ | B60R 16/0237 250/202 |
| 3,768,383 A * | 10/1973 | Tucker | ............ | E01F 9/553 116/63 R |
| 4,040,760 A * | 8/1977 | Wyckoff | ............ | E01F 9/524 359/551 |
| 4,182,548 A * | 1/1980 | Searight | ............ | G02B 5/12 359/531 |
| 4,236,788 A * | 12/1980 | Wyckoff | ............ | G02B 5/128 359/551 |
| 4,332,437 A * | 6/1982 | Searight | ............ | E01F 9/578 359/531 |
| 4,542,709 A * | 9/1985 | Spaugh | ............ | B60Q 7/00 116/63 P |
| 4,573,763 A * | 3/1986 | Thomas | ............ | G02B 5/132 359/538 |
| 4,712,867 A * | 12/1987 | Malek | ............ | E01F 9/524 359/530 |
| 4,790,684 A * | 12/1988 | Adams | ............ | E01F 9/529 116/63 R |
| 5,006,010 A * | 4/1991 | Duckett | ............ | E01F 9/553 404/12 |
| 6,517,923 B1 * | 2/2003 | Nakayama | ............ | G02B 5/124 359/530 |
| 7,077,600 B1 * | 7/2006 | Whinery | ............ | E01F 9/553 404/12 |
| 2007/0258764 A1 * | 11/2007 | Broughton | ............ | E01F 13/10 404/15 |
| 2011/0081201 A1 * | 4/2011 | Croce | ............ | E01F 13/10 404/16 |

* cited by examiner

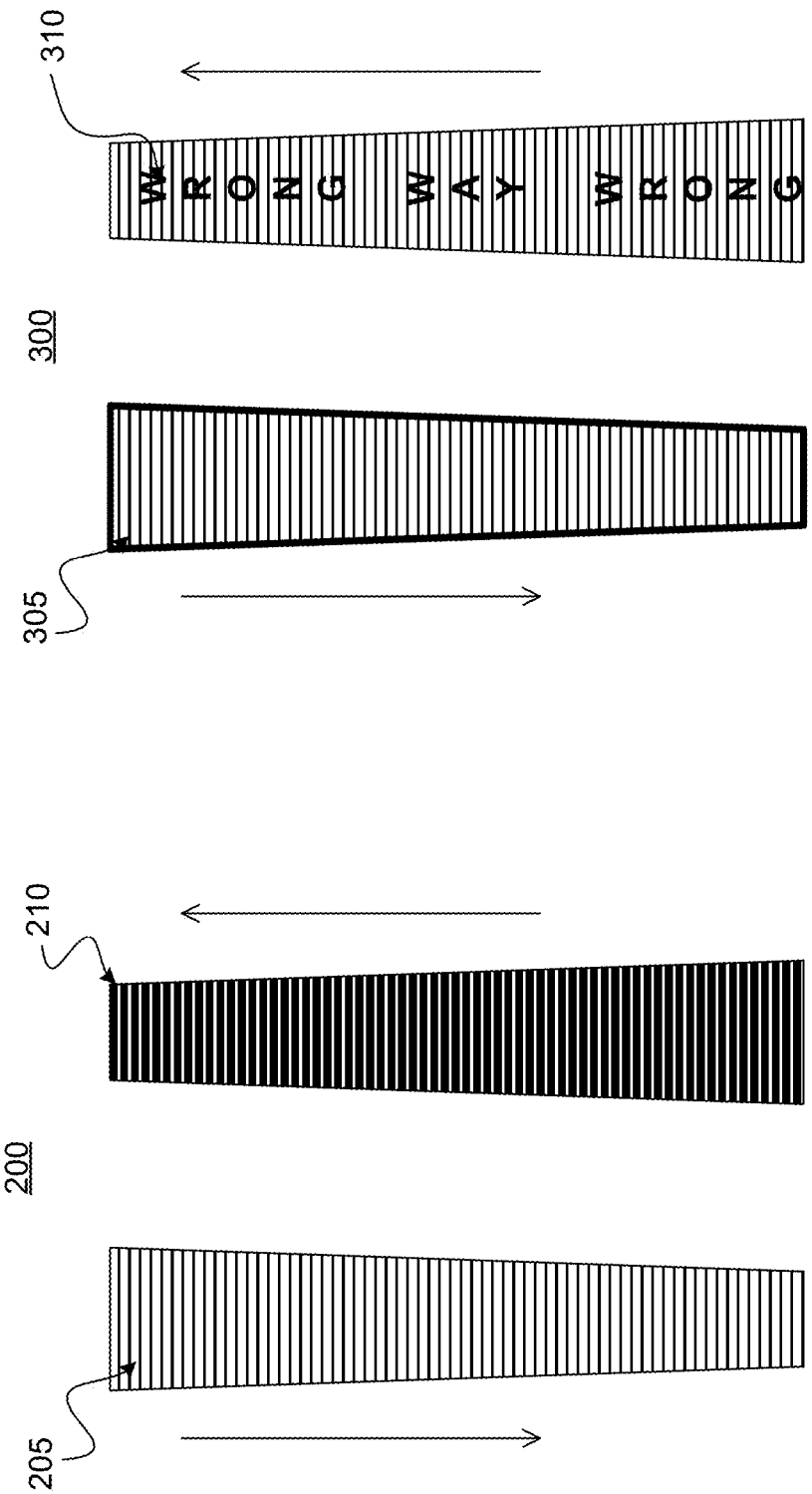

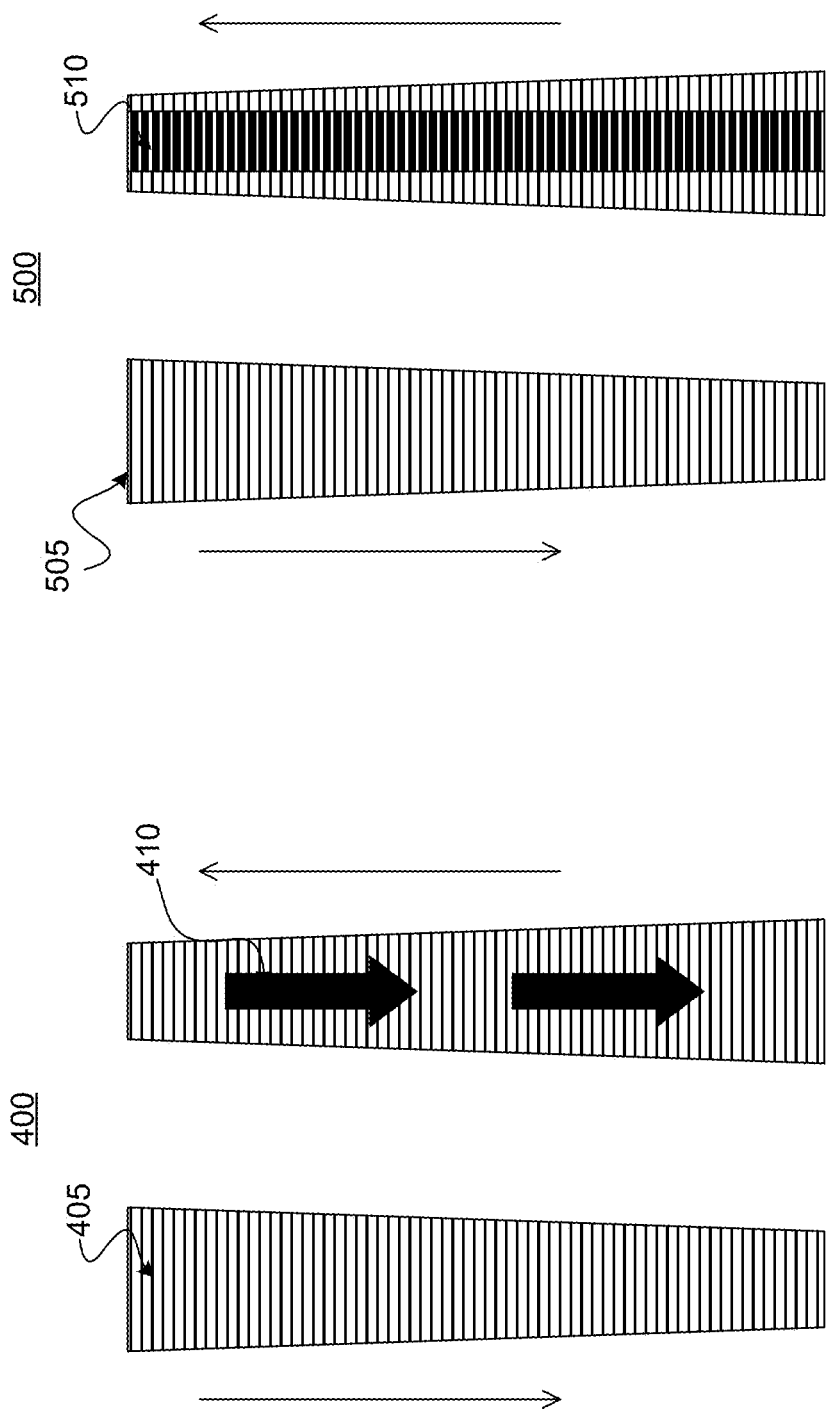

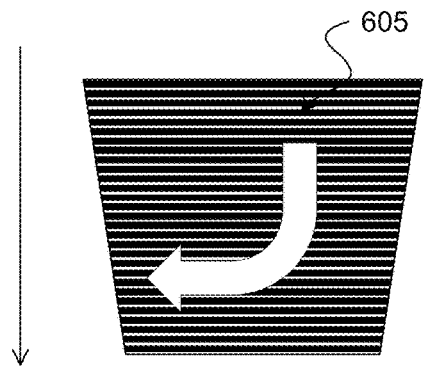
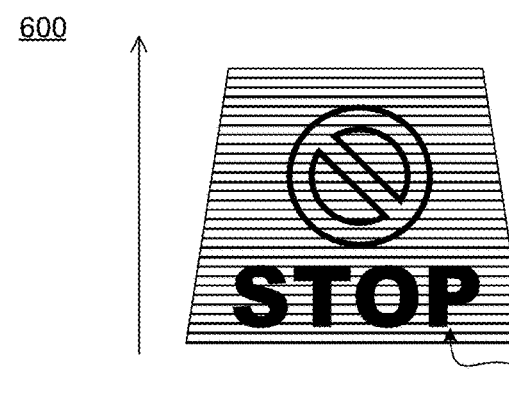
FIG. 6A  FIG. 6B
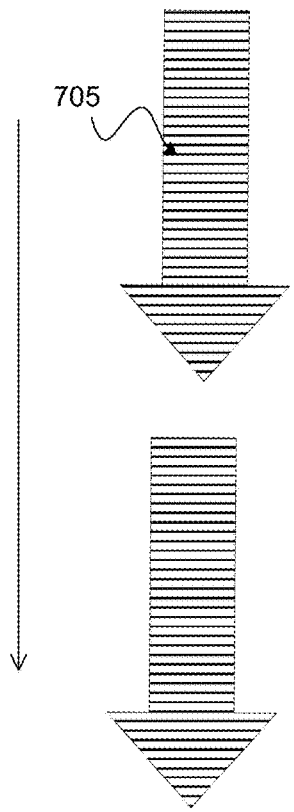
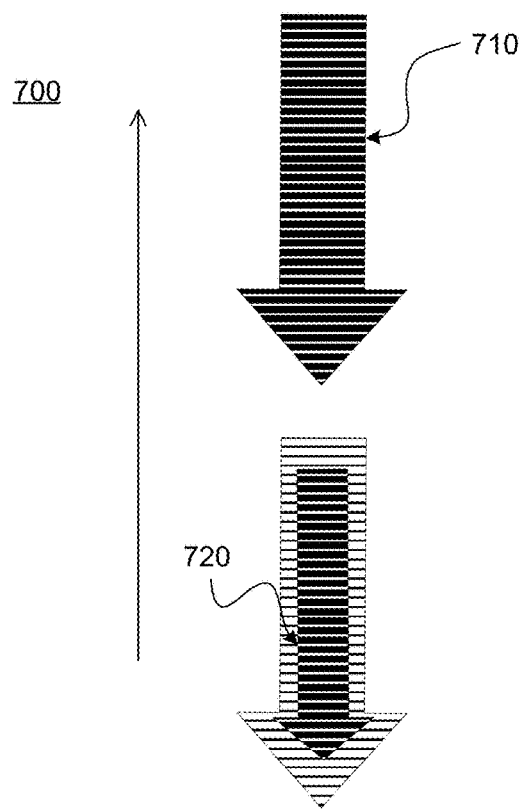
FIG. 7A  FIG. 7B

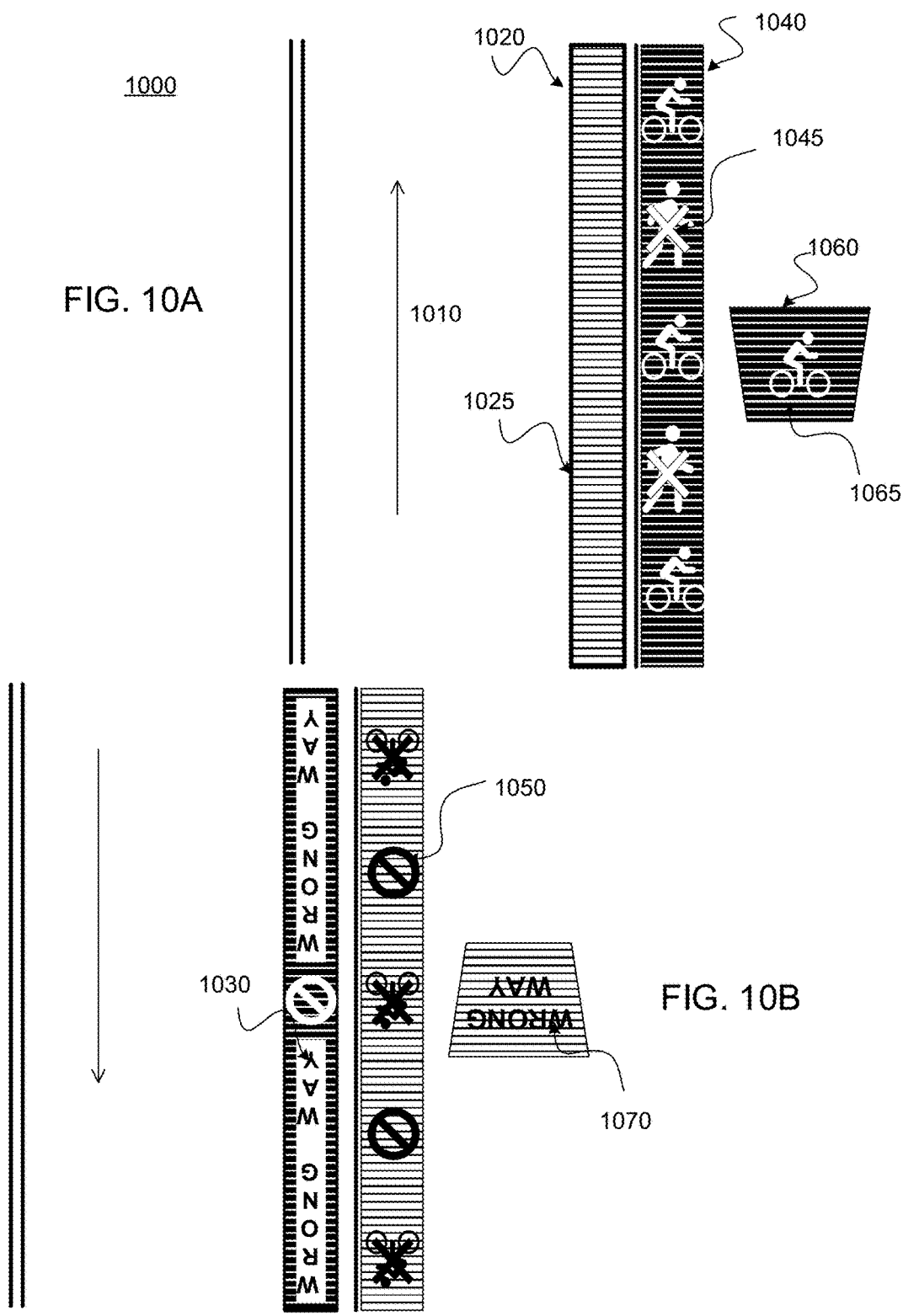

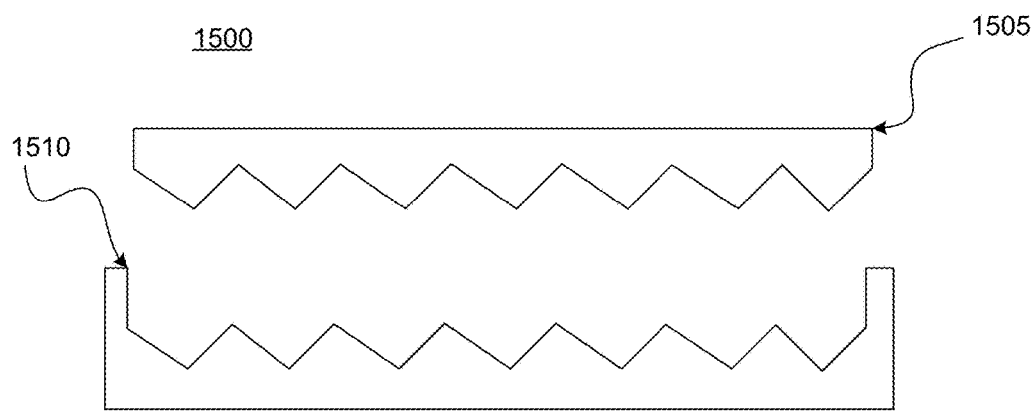
FIG. 15A
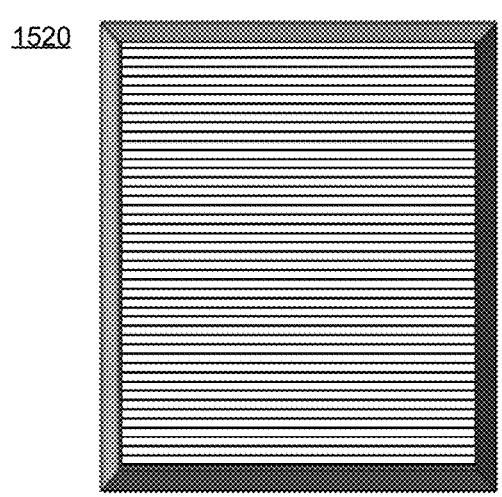 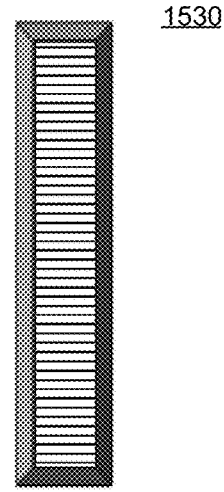
FIG. 15B  FIG. 15C

DIRECTIONAL SURFACE MARKING SAFETY AND GUIDANCE DEVICES AND SYSTEMS

CROSS-REFERENCE TO RELATED APPLICATION

This application claims priority to and the full benefit of U.S. Provisional Patent Application Ser. No. 62/518,112 (filed Jun. 12, 2017, and titled "DUAL COLOR ROAD MARKER SAFETY DEVICE"), the entire contents of which are incorporated herein by reference.

BACKGROUND OF THE DISCLOSURE

Since the inception of automobiles, motorists have caused or experienced automobile accidents. Head-to-head collisions are some of the most deadly accident types. These accidents most commonly occur when a motorist enters into a divided highway or a one way roadway in the incorrect direction. These accidents are disproportionately caused by impaired or aged motorists. As a result, there is a great need to alert motorists who unintentionally travel in the incorrect direction.

Motorists, cyclists, and pedestrians utilize various infrastructure elements, such as signs, markings, and markers, to guide them down a road, lane, path, or hallway. One of the most effective elements is that of surface markings or markers. The most common types of applied surface markings on the roadway are longitudinal and lateral lines, symbols, messages, and raised or embedded pavement markers. These markings provide both guidance and warning messages specific to the viewer's need. Unlike a vertically posted sign, surface markings are applied and viewed horizontally on the surface. The result is that viewers traveling in either direction receive the same visual message. At best, these types of markings have limited effectiveness. At worst, these types of markings are confusing to the viewer and impact to their safety.

The color and content of a marking is another important factor for providing a clear concise message to the viewer. The color of these markings provide crucial guidance and warning information to motorists. Yellow markings divide traffic traveling in the opposite direction. White markings are used for lateral and edge lines, symbols, messages, and dividing traffic traveling in the same direction. Red, when used, indicates 'danger' and is often associated with stop, do not enter, or wrong way warnings.

In an effort to reduce horrific accidents on roadways, some agencies deployed intelligent transportation devices like that of radar systems placed in limited locales such as select highway exit ramps. These detect incorrect direction travel and activate a digital warning sign. These are very effective, but are extremely expensive and can only be installed in limited environments.

Roadway markings in their current form do little to prevent or alert motorists of incorrect direction travel. Longitudinal and lateral lane lines do not provide clear orientation of the travelway's direction. The orientation of symbols and legends do provide some conspicuity of the travel direction to normal non-impaired motorists, but are only slightly effective and nearly undistinguishable to an impaired motorist. Agencies are reluctant to install additional conventional bidirectional roadway markings since they are concerned with distracting or confusing a motorist traveling in the correct direction.

Supplemental raised or embedded markers are periodically installed on or parallel to the lane lines to aid drivers in identifying the markings during nighttime or in adverse weather conditions. These markers are traditionally the same color as the line they are placed on or next to. Some agencies utilize bidirectional markers that display white in one direction and red in the other to assist in incorrect direction alert. However, at a norm of 40 foot centers and less than 8 square inches of displayed color, these have been found to be an inadequate alert device in many cases.

Currently, there is no device specifically designed to provide a bidirectional marking with a unidirectional message dependent upon the direction of travel by the viewer. Surface markings or markers are limited to provide a single message, seen from both directions.

SUMMARY OF THE DISCLOSURE

What is needed is a device and system to provide a conspicuous, clear, concise message or alert to the motorist, viewer, or user. This means that the unique driving and viewing habits of these motorists must be considered when providing such alert. One use of the present disclosure is to reduce wrong way driving incidences on roadways. This disclosure may accomplish this while not causing distractions or confusion to unintended users. The system and devices may be affordable and usable by agencies of most budgets and environments.

The present disclosure provides for a directional surface marking that provides directional messaging to users based on their direction of travel on a base surface, such as a roadway, walkway, or interior flooring, as non-limiting examples. In some aspects, the directional messaging may comprise different colors, text, or symbols, wherein a user may view different directional messaging on a directional surface marking dependent on direction of travel. In some embodiments, directional surface markings may comprise a profile layer, wherein the profile layer may comprise a plurality of profiles, which may allow for an application of directional messaging.

The present disclosure may also be used for pedestrian guidance and warnings. Many pedestrian pathways, as in public parks and hallways of large public buildings such as hospitals, can be very complex and confusing to the traveling pedestrians. Currently guidance is provided mostly by periodically posted vertical and horizontal signage. Often pedestrians will need to traverse the pathway or hallway for several yards between signs that provide direction or guidance. In some larger facilities a surface applied continuous vinyl color coded tape is used to provide such guidance to various departments. However, it is difficult to determine which direction is the department and which is the exit. These methods not only cause the pedestrian aggravation, but present a danger when emergency exiting is necessary.

The present disclosure may also reduce wrong way cycling incidences on bicycle paths and lanes. The installation and use of bicycle paths and lanes are dramatically increasing worldwide. Bicycle paths are normally unidirectional like that of a one-way roadway. Standard white markings are used and no pavement markers are used due to bicycle wheel deflection issues. Bicycle paths can be dangerous in incorrect direction travel as well with the excessive roadway cycling speeds and limited bodily protection. These paths need alert of incorrect direction travel without significant wheel deflection of the cycle.

The present disclosure relates to a directional surface marking device comprising: a profile layer located parallel to a base surface, the profile layer comprising at least a first profile comprising a first coating, wherein the first coating provides a first directional messaging viewable when a user traverses the base surface in a first direction, and a second profile comprising a second coating. In some aspects, an upper portion of the base surface may comprise the profile layer. In some embodiments, the directional surface marking device may comprise a longitudinal shape, wherein a length of the directional surface marking device exceeds a width of the directional surface marking device. In some implementations, the directional surface marking device may comprise a lateral shape, wherein a width of the directional surface marking device exceeds a length of the directional surface marking device.

In some aspects, the first directional messaging may comprise one or more text, color, or symbol. In some embodiments, the directional surface marking device may further comprise a conformance layer attached to the base of the profile layer. In some implementations, the directional surface marking device may further comprise an adhesive layer attached to the conformance layer, wherein the adhesive layer is configured to attach to the base surface.

In some embodiments, the second coating may provide a second directional messaging viewable when a user traverses the base surface in a second direction. In some implementations, the second directional messaging may comprise one or more text, color, or symbol. In some aspects, at least a portion of the profile layer may be coated in a retroreflective material. In some embodiments, the base surface may comprise a roadway, such as wherein the first profile and the second profile are configured to be viewable by the user traversing the base surface in a vehicle.

In some implementations, the first profile and the second profile may be configured to be viewable by the user traversing the base surface as a pedestrian. In some embodiments, the first directional messaging may provide information related to a flow of traffic traversing the base surface. In some aspects, the first direction may comprise a wrong direction of vehicular traffic.

In some embodiments, the base surface may comprise a pedestrian walkway, such as wherein the first profile and the second profile are configured to be viewable by the user traversing the base surface as a pedestrian. In some aspects, the directional surface marking device may further comprise a secondary alert mechanism. In some embodiments, the secondary alert mechanism may comprise a directional vibratory alert, wherein a first vibratory alert is perceptible when a user traverses the base surface in the first direction and a second vibratory alert is perceptible when a user traverses the base surface in a second direction. In some implementations, the secondary alert mechanism may comprise a directional auditory alert, wherein a first auditory alert is perceptible when a user traverses the base surface in the first direction and a second auditory alert is perceptible when a user traverses the base surface in a second direction.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 2A illustrates a first view of an exemplary longitudinal directional surface marking, wherein the first view may be perceived when a user traverses a base surface in a first direction.

FIG. 2B illustrates a second view of an exemplary longitudinal directional surface marking, wherein the second view may be perceived when a user traverses a base surface in a second direction.

FIG. 3A illustrates a first view of an exemplary longitudinal directional surface marking, wherein the first view may be perceived when a user traverses a base surface in a first direction.

FIG. 3B illustrates a second view of an exemplary longitudinal directional surface marking, wherein the second view may be perceived when a user traverses a base surface in a second direction.

FIG. 4A illustrates a first view of an exemplary longitudinal directional surface marking, wherein the first view may be perceived when a user traverses a base surface in a first direction.

FIG. 4B illustrates a second view of an exemplary longitudinal directional surface marking, wherein the second view may be perceived when a user traverses a base surface in a second direction.

FIG. 5A illustrates a first view of an exemplary longitudinal directional surface marking, wherein the first view may be perceived when a user traverses a base surface in a first direction.

FIG. 5B illustrates a second view of an exemplary longitudinal directional surface marking, wherein the second view may be perceived when a user traverses a base surface in a second direction.

FIG. 6A illustrates a first view of an exemplary directional surface marking, wherein the first view may be perceived when a user traverses a base surface in a first direction.

FIG. 6B illustrates a second view of an exemplary directional surface marking, wherein the second view may be perceived when a user traverses a base surface in a second direction.

FIG. 7A illustrates a first view of an exemplary arrow directional surface marking, wherein the first view may be perceived when a user traverses a base surface in a first direction.

FIG. 7B illustrates a second view of an exemplary arrow directional surface marking, wherein the second view may be perceived when a user traverses a base surface in a second direction.

FIG. 10A illustrates a first view of a system of exemplary directional surface markings, wherein the first view may be perceived when a user traverses a base surface in a first direction.

FIG. 10B illustrates a second view of a system of exemplary directional surface markings, wherein the second view may be perceived when a user traverses a base surface in a second direction.

FIG. 15A illustrates an exemplary mold system for manufacturing directional surface markings, according to some embodiments of the present disclosure.

FIG. 15B illustrates an exemplary directional surface marking, wherein the directional surface marking may be manufactured from a mold system.

FIG. 15C illustrates an exemplary directional surface marking, wherein the directional surface marking may be manufactured from a mold system.

DETAILED DESCRIPTION

The present disclosure provides generally for an improved marking system. More specifically, the present disclosure relates to directional surface markings that may provide directional messaging.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

User: as used herein refers to an individual who may interact with directional surface markings. In some embodiments, a user may comprise a pedestrian, cyclist, motorist, or passenger, as non-limiting examples.

Directional Surface Markings: as used herein refers to a system or device that may provide directional messaging to a user, wherein a user traversing a base surface in a first direction may perceive a first directional message and traversing a base surface in a second direction may perceive a second directional message.

Base Surface: as used herein refers to a traversable surface wherein directional surface markings may be installed horizontally, such as integrated parallel with the base surface, or vertically, such as integrated in a structure extending from a base surface.

Profile Layer: as used herein refers to an upper layer of directional surface markings, which may comprise a topography that may allow for directional messaging. In some aspects, a profile layer may comprise a plurality of profiles, wherein each profile may provide a directional message. For example, a first profile may comprise a series of angled surfaces facing one direction painted with white dotted lines, and a second profile may comprise a series of angled surfaces facing an opposite direction painted with the text "Wrong Direction," wherein facing the first profile allows a user to perceive the white dotted lines and facing the second profile may allow a user to perceive "Wrong Direction."

Directional Message or Directional Messaging: as used herein refers to an informational indication provided by directional surface markings, wherein viewing a directional surface marking from a first direction may provide a first directional message and viewing a directional surface marking from a second direction may provide a second directional message. In some embodiments, a directional message may comprise one or more pattern, symbol, text, or color, as non-limiting examples.

Figure 1A:
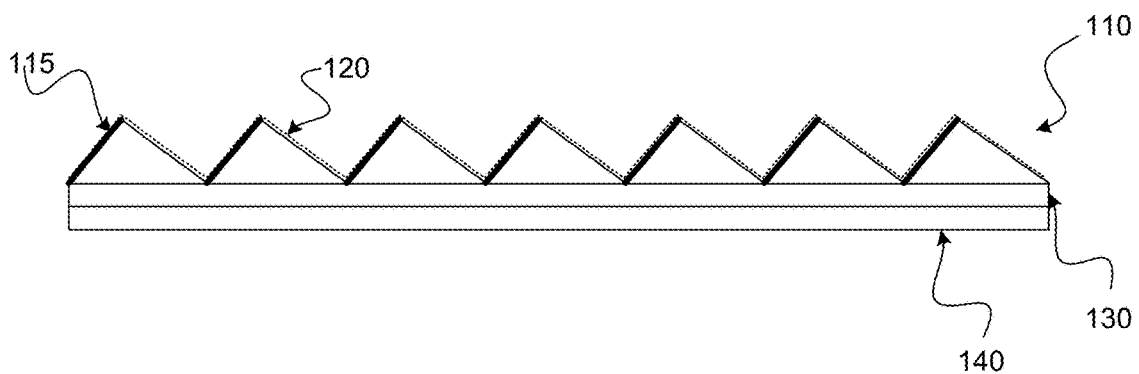
FIG. 1A illustrates a cross section of an exemplary directional surface marking, according to some embodiments of the present disclosure.
Figure 1B:
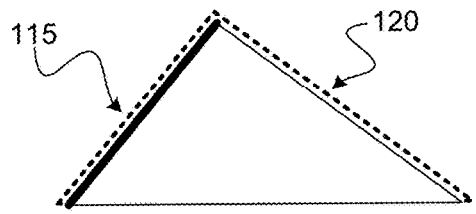
FIG. 1B illustrates a cross section of an exemplary directional surface marking, according to some embodiments of the present disclosure.

Referring now to FIGS. 1A-1B, a cross section of an exemplary directional surface marking 100 is illustrated. In some aspects, a directional surface marking 100 may comprise a profile layer 110 as an upper layer, wherein the profile layer 110 may comprise a first profile 115 and a second profile 120. In some embodiments, the first profile 115 may be coated in a paint or material, wherein the coating may be visible when a user is traversing a base surface in a first direction. In some aspects, the second profile 120 may be coated in a paint or material, wherein the coating may be visible when a user is traversing a base surface in a second direction. In some implementations, the first direction may be the opposite direction of the second direction.

In some aspects, the profile layer 110 may be coated with a paint or material that may enhance one or more characteristics of the directional surface marking 100, such as visibility or durability, as non-limiting examples. For example, the profile layer 110 may be coated with a retroreflective material, which may enhance visibility of the profile layer 110 where the base surface may be traversed by vehicles or users with portable lighting. For example, the base coating may comprise a pigment, and a top coat may comprise glass micro-spheres. In some embodiments, the profile layer 110 may comprise a flexible material, such as a polymeric, rubber, epoxy, or acrylic, as non-limiting examples. In some implementations, at least a portion of the profile layer 110 may comprise a rigid material, such as a cement, asphalt, glass, or other rigid material.

In some implementations, directional surface markings 100 may comprise a plurality of layers. In some embodiments, the directional surface markings 100 may comprise a conformance layer 130 and an adhesive layer 140. In some aspects, the adhesive layer 140 may allow for installation of the directional surface markings 100 into a base surface. For example, the directional surface markings 100 may be attached through adhesive bonding, thermal bonding, or mechanically fastened, as non-limiting examples. In some embodiments, the method of installation may depend on the base surface, such as a concrete walkway, an asphalt roadway, or interior flooring, as non-limiting examples.

In some embodiments, directional surface markings 100 may be manufactured through one or more manufacturing techniques, such as compression, calendaring, extrusion, injection, transfer, or 3D printing, as non-limiting examples. In some implementations, the method of manufacture may depend on the application, such as the type of base surface, as installing directional surface markings 100 on an asphalt roadway may have different requirements than on an interior pedestrian walkway.

In some aspects, the angles and height of the first and second profile may depend on the use. For example, where the base surface may comprise a roadway, the height may need to be low enough as to not impede the ability to drive over the base surface, and the angle may need to be perceptible to drivers and passengers. As another example, where the base surface may comprise an interior walkway, the height may need to be low enough as to not cause pedestrians to trip or stumble, and the angle need to be perceptible to pedestrians of various sizes, including those who may be in a wheelchair.

As an illustrative example, the directional surface markings 100 may be installed on a roadway, wherein users may traverse the base surface in a vehicle. Drivers and passengers may be able to view acute profiles that may face the direction of travel. For example, the first profile 115 may comprise a series of 65 degree angles, and the second profile 120 may comprise a series of 35 degree angles.

Referring now to FIGS. 2A-2B, an exemplary longitudinal directional surface marking 200 is illustrated, wherein FIG. 2A and FIG. 2B illustrate views of the longitudinal directional surface marking 200 from opposite directions. In some aspects, as illustrated in FIG. 2A, traversing a base surface in a first direction may show a first color 205, such as one that may blend with the base surface. In some embodiments, as illustrated in FIG. 2B, traversing a base surface in a second a direction may show a first directional message 210, such as a color indicator that may indicate a vehicle is traversing a roadway in the wrong direction.

Referring now to FIGS. 3A-3B, an exemplary longitudinal directional surface marking 300 is illustrated, wherein FIG. 3A and FIG. 3B illustrate views of the longitudinal directional surface marking 300 from opposite directions. In some implementations, as illustrated in FIG. 3A, traversing a base surface in a first direction may show a first color 305, such as one that may blend with the base surface. In some embodiments, as illustrated in FIG. 3B, traversing a base surface in a second a direction may show a first directional message 310, such as a text indicator that may indicate a vehicle is traversing a roadway in the wrong direction.

Referring now to FIGS. 4A-4B, an exemplary longitudinal directional surface marking 400 is illustrated, wherein FIG. 4A and FIG. 4B illustrate views of the longitudinal directional surface marking 400 from opposite directions. In some embodiments, as illustrated in FIG. 4A, traversing a base surface in a first direction may show a first color 405, such as one that may blend with the base surface. In some embodiments, as illustrated in FIG. 4B, traversing a base surface in a second a direction may show a first directional message 410, such as a symbol indicator that may indicate a vehicle is traversing a roadway in the wrong direction.

Referring now to FIGS. 5A-5B, an exemplary longitudinal directional surface marking 500 is illustrated, wherein FIG. 5A and FIG. 5B illustrate views of the longitudinal directional surface marking 500 from opposite directions. In some implementations, as illustrated in FIG. 2A, traversing a base surface in a first direction may show a first color 505, such as one that may blend with the base surface. In some embodiments, as illustrated in FIG. 5B, traversing a base surface in a second a direction may show a first directional message 510, such as a color stripe indicator that may indicate a vehicle is traversing a roadway in the wrong direction.

Referring now to FIGS. 6A-6B, an exemplary directional surface marking 600 is illustrated, wherein FIG. 6A and FIG. 6B illustrate views of the directional surface marking 600 from opposite directions. In some aspects, as illustrated in FIG. 6A, traversing a base surface in a first direction may show a first directional message 605, such as one that may indicate a turn lane against a contrasting background. In some embodiments, as illustrated in FIG. 6B, traversing a base surface in a second a direction may show a second directional message 610, such as a combination of a symbol and text that may indicate a vehicle is traversing a roadway in the wrong direction.

Referring now to FIGS. 7A-7B, exemplary arrow directional surface markings 700 are illustrated, wherein FIG. 7A and FIG. 7B illustrate views of the directional surface markings 700 from opposite directions. In some aspects, as illustrated in FIG. 7A, traversing a base surface in a first direction may show a first color 705, such as one that may contrast with the base surface. In some embodiments, as illustrated in FIG. 7B, traversing a base surface in a second a direction may show a first directional message 710 and second directional message 720, such as color indicators that may indicate a vehicle is traversing a roadway in the wrong direction.

Figure 8A:
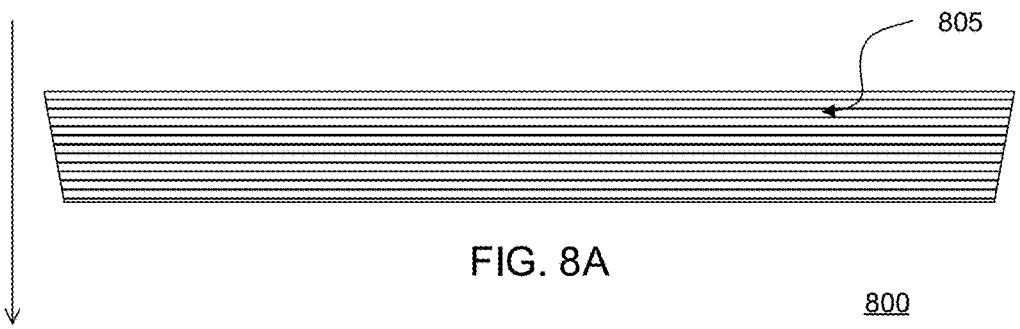
FIG. 8A illustrates a first view of an exemplary lateral directional surface marking, wherein the first view may be perceived when a user traverses a base surface in a first direction.
Figure 8B:
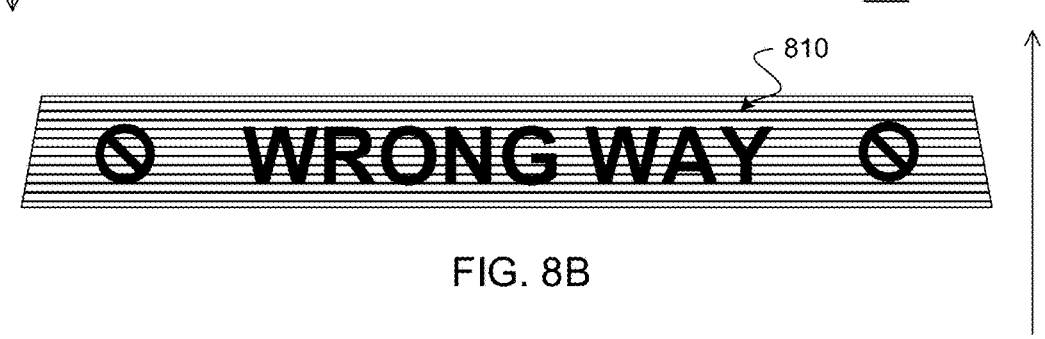
FIG. 8B illustrates a second view of an exemplary lateral directional surface marking, wherein the second view may be perceived when a user traverses a base surface in a second direction.

Referring now to FIGS. 8A-8B, an exemplary lateral directional surface marking 800 is illustrated, wherein FIG. 8A and FIG. 8B illustrate views of the directional surface marking 800 from opposite directions. In some implementations, as illustrated in FIG. 8A, traversing a base surface in a first direction may show a first color 805, such as one that may blend with the base surface. In some embodiments, as illustrated in FIG. 8B, traversing a base surface in a second a direction may show a first directional message 810, such as a combination of symbols and text that may indicate a vehicle is traversing a roadway in the wrong direction.

Figure 9A:
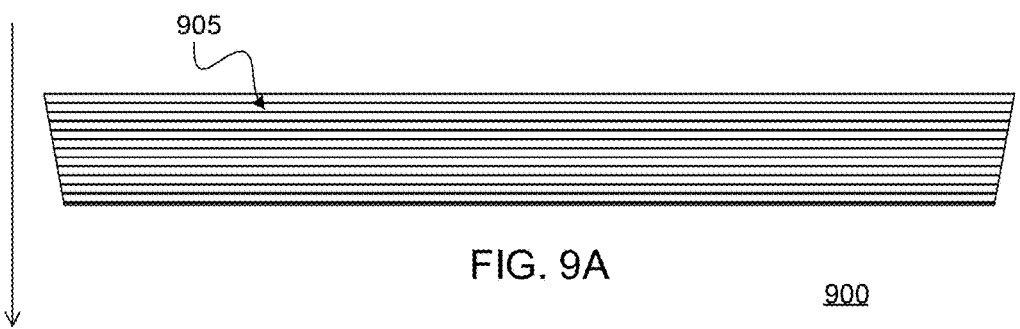
FIG. 9A illustrates a first view of an exemplary lateral directional surface marking, wherein the first view may be perceived when a user traverses a base surface in a first direction.
Figure 9B:
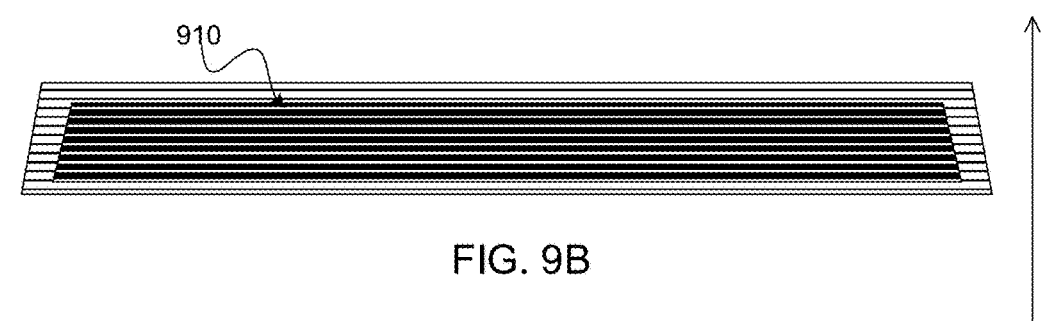
FIG. 9B illustrates a second view of an exemplary lateral directional surface marking, wherein the second view may be perceived when a user traverses a base surface in a second direction.

Referring now to FIGS. 9A-9B, an exemplary lateral directional surface marking 900 is illustrated, wherein FIG. 9A and FIG. 9B illustrate views of the directional surface marking 900 from opposite directions. In some aspects, as illustrated in FIG. 9A, traversing a base surface in a first direction may show a first color 905, such as one that may blend with the base surface. In some embodiments, as illustrated in FIG. 9B, traversing a base surface in a second a direction may show a first directional message 910, such as a color indicator that may indicate a vehicle is traversing a roadway in the wrong direction.

Referring now to FIGS. 10A-10B, an exemplary system 1000 of directional surface markings 1020, 1040, 1060 is illustrated, wherein FIG. 10A and FIG. 10B illustrate views of the directional surface markings 1020, 1040, 1060 from opposite directions. In some aspects, a system 1000 may be integrated into a roadway 1010, wherein a traffic directional surface marking 1020 may comprise directional messaging related to the flow of traffic. For example, for traffic traveling the correct direction down a roadway 1010, a traffic directional surface marking 1020 may comprise a white line 1025 with a contrasting frame, which may allow for guidance of automated vehicles. For traffic traveling the incorrect direction down a roadway 1010, the traffic directional surface marking 1020 may comprise wrong way directional messaging 1030, which may comprise a combination of text and symbols.

In some embodiments, the traffic directional surface marking 1020 may provide additional functionality, such as those related to enhancing safety or providing guidance. For example, the traffic directional surface marking 1020 may provide a vibratory or an auditory alert for vehicles that may be traversing over the traffic directional surface marking 1020, wherein the alert may indicate to a user that they are swerving off the roadway 1010. In some implementations, the profile layer may provide the additional functionality. In some aspects, the profile layer may be configured to allow for different levels of alert based on the direction of travel. For example, the vibratory alert may be stronger for users traveling the wrong way on the roadway 1010.

In some aspects, the system 1000 may comprise a cyclist lane, which may comprise one or more directional surface markings 1040, 1060. In some embodiments, the cyclist directional surface markings 1040, 1060 may provide information about the cyclist lane. For example, a longitudinal cyclist directional surface marking 1040 may be installed in the cyclist lane and a rectangular cyclist directional surface marking 1060 may be installed proximate to the cyclist lane.

In some embodiments, for a cyclist traveling the correct direction with the flow of traffic, the longitudinal cyclist directional surface marking 1040 may comprise a directional message 1045 of symbols that may indicate that the cyclist is allowed in the lane and is traveling the correct direction, and for a cyclist traveling the incorrect direction, the longitudinal cyclist directional surface marking 1040 may comprise a directional message 1050 of symbols that may indicate the cyclist is traveling the incorrect direction. The directional message 1045 may further indicate that pedestrians are not permitted on the cyclist lane. The rectangular cyclist directional surface marking 1060 may comprise similar directional messaging 1065, 1070, wherein a cyclist traveling the correct direction may perceive a cyclist symbol, and a cyclist traveling the incorrect direction may perceive text indicating "wrong way."

Figure 11A:
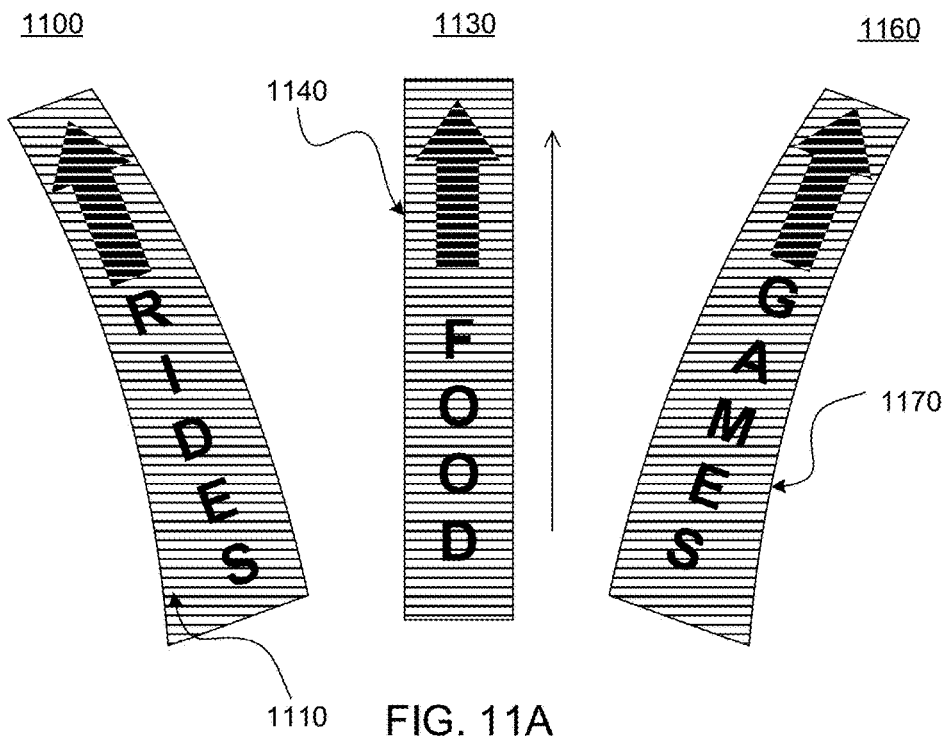
FIG. 11A illustrates a first view of a system of exemplary directional surface markings, wherein the first view may be perceived when a user traverses a base surface in a first direction.
Figure 11B:
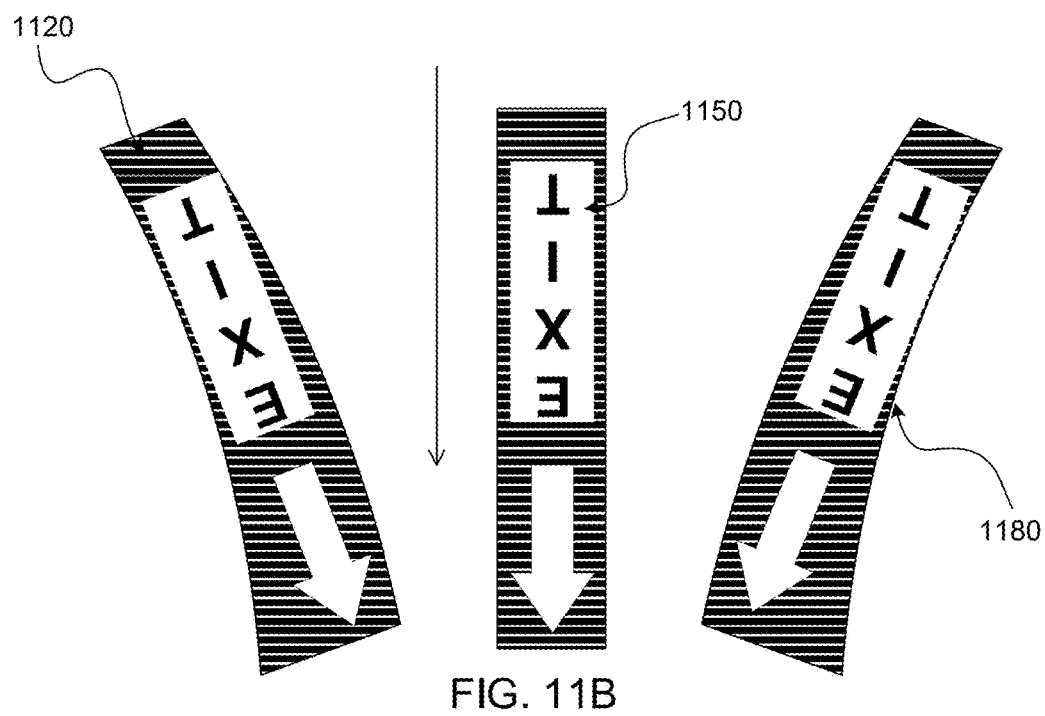
FIG. 11B illustrates a second view of a system of exemplary directional surface markings, wherein the second view may be perceived when a user traverses a base surface in a second direction.

Referring now to FIGS. 11A-11B, an exemplary system of directional surface markings 1100, 1130, 1160 is illustrated, wherein FIG. 11A and FIG. 11B illustrate views of the directional surface markings 1100, 1130, 1160 from opposite directions. In some aspects, directional surface markings 1100, 1130, 1160 may be installed on a pedestrian pathway, such as at an amusement park. In some aspects, a user may be entering an amusement park and wonder which direction they need to travel to reach different areas of the park. In some embodiments, directional surface markings 1100, 1130, 1160 may be installed on the walkway, wherein users may be directed to different parts of the park based on the entrance directional messaging 1110, 1140, 1170. For example, a user may be directed left to reach rides, straight to reach food, and right to reach games.

In some implementations, a user attempting to exit the amusement park may be directed by exit directional messaging 1120, 1150, 1180, wherein the directional surface markings 1100, 1130, 1160 may indicate the exits when a user is traversing the base surface in a direction away from the main areas. In some aspects, the exit directional messaging 1120, 1150, 1180 may comprise a combination of symbols and text, which may clearly provide guidance to users. In some aspects, one or both the exit directional messaging 1120, 1150, 1180 and the entrance directional messaging 1110, 1140, 1170 may be coated in a material that may enhance visibility in low visibility conditions, such as at night, in storms, or in fog, as non-limiting conditions.

Figure 12A:
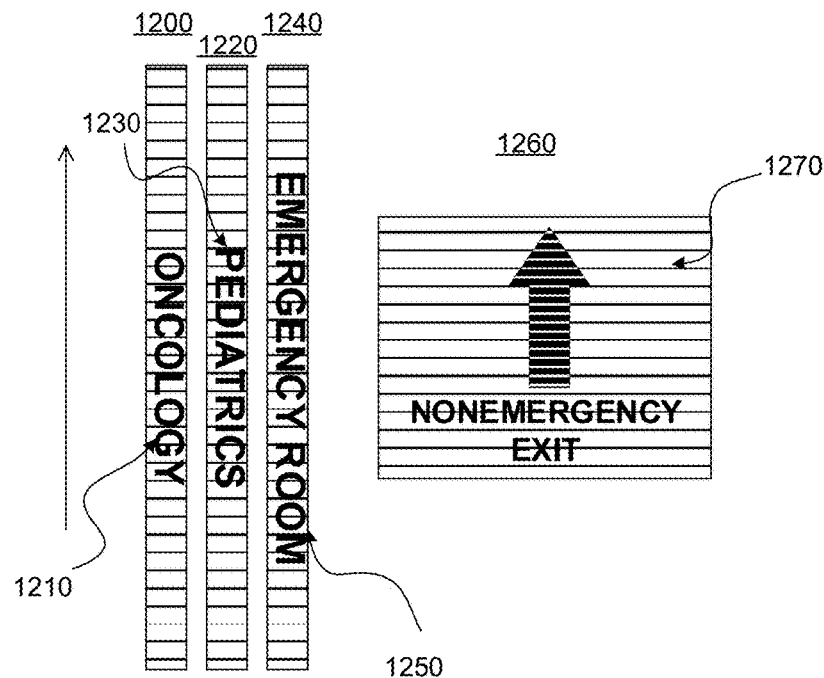
FIG. 12A illustrates a first view of a system of exemplary directional surface markings, wherein the first view may be perceived when a user traverses a base surface in a first direction.
Figure 12B:
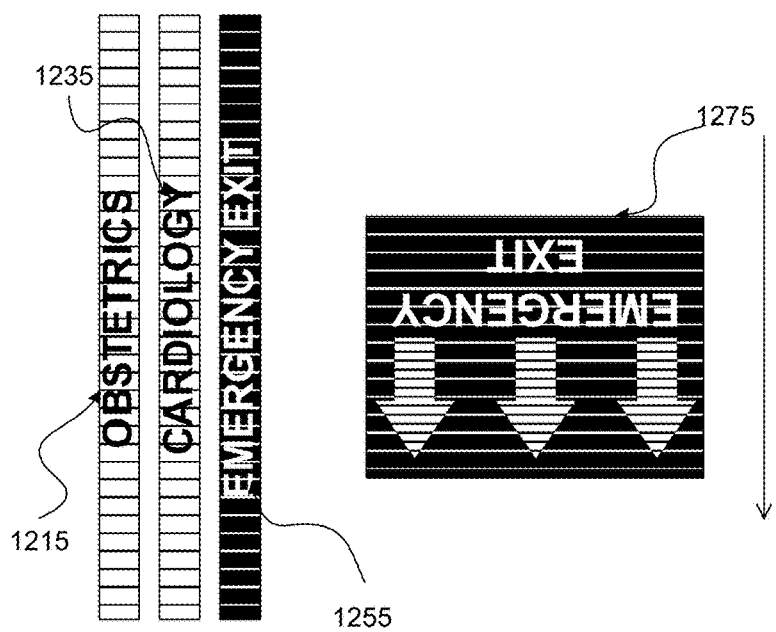
FIG. 12B illustrates a second view of a system of exemplary directional surface markings, wherein the second view may be perceived when a user traverses a base surface in a second direction.

Referring now to FIGS. 12A-12B, an exemplary system of directional surface markings 1200, 1220, 1240, 1260 is illustrated, wherein FIG. 12A and FIG. 12B illustrate views of the directional surface markings 1200, 1220, 1240, 1260 from opposite directions. In some aspects, directional surface markings 1200, 1220, 1240, 1260 may be installed on a pedestrian pathway, such as an interior of a hospital. In some embodiments, a user may need to navigate the interior of hospital, wherein each direction may lead to different areas of the hospital, and directional surface markings 1200, 1220, 1240, 1260 may be installed to direct users.

In some embodiments, a mix of longitudinal directional surface markings 1200, 1220, 1240 and rectangular directional surface markings 1260 may be used. In some aspects, the longitudinal directional surface markings 1200, 1220, 1240 may indicate the paths to different areas of the hospital. For example, traveling in a first direction, the directional messaging 1210, 1230, 1250, 1270 may indicate that the first direction may lead to oncology, pediatrics, the emergency room, and a non-emergency exit, such as one that may not be stairwell accessible. Traveling in a second direction, the directional messaging 1215, 1235, 1255, 1275 may indicate that the second direction may lead to obstetrics, cardiology, and an emergency exit.

In some embodiments, emergency exit directional messaging 1255, 1275 may comprise a different color, which may enhance visibility for the paths to emergency exits. In some aspects, each directional message 1210, 1215, 1230, 1235, 1250, 1255, 1270, 1275 may comprise different colors, which may allow for continuity between sections of directional surface markings 1200, 1220, 1240, 1260. For example, the path to obstetrics may be pink, the path to pediatrics may be blue, and any paths to emergency exits may be red. In some aspects, some directional messaging may be coated to allow for enhanced visibility in low visibility conditions, such as a power outage.

Figures 13A, 13B:
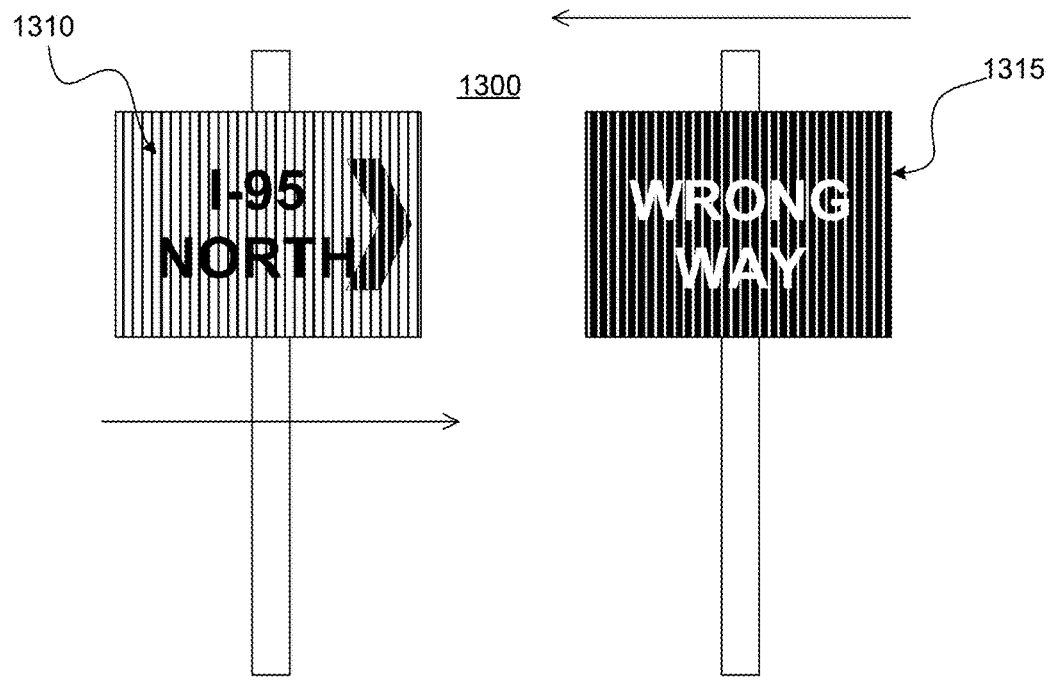
FIG. 13A illustrates a first view of an exemplary vertical directional surface marking, wherein the first view may be perceived when a user traverses a base surface in a first direction.
FIG. 13B illustrates a second view of an exemplary vertical directional surface marking, wherein the second view may be perceived when a user traverses a base surface in a second direction.

Referring now to FIGS. 13A-13B, an exemplary vertical directional surface marking 1300 is illustrated, wherein FIG. 13A and FIG. 13B illustrate views of the directional surface marking 1300 from opposite directions. In some aspects, a vertical directional surface marking 1300 may comprise a sign installed perpendicular to a base surface, such as a roadway. For example, the vertical directional surface marking 1300 may be installed at a turn or exit, wherein a user turning correctly onto the exit may view a directional message 1310 that indicates where the exit lead. A user traversing the road in the incorrect direction may view a directional message 1315 that may alert the user they are traveling the "wrong way."

Figures 14A, 14B:
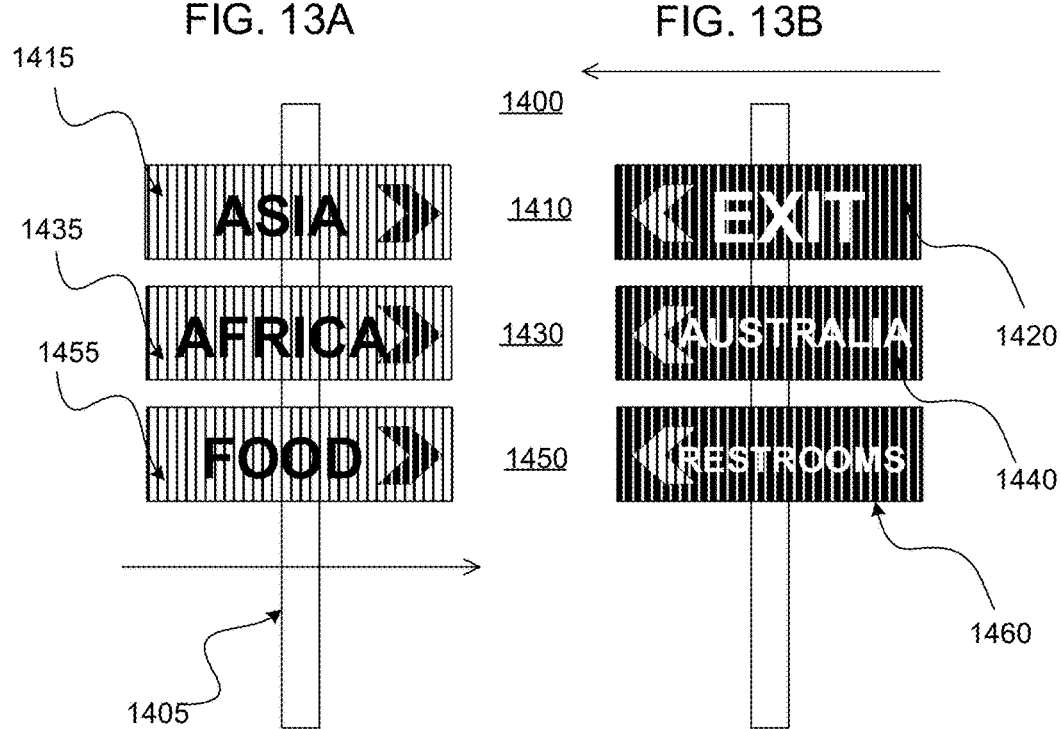
FIG. 14A illustrates a first view of a system of exemplary vertical directional surface markings, wherein the first view may be perceived when a user traverses a base surface in a first direction.
FIG. 14B illustrates a second view of a system of exemplary vertical directional surface markings, wherein the second view may be perceived when a user traverses a base surface in a second direction.

Referring now to FIGS. 14A-14B, an exemplary system 1400 of vertical directional surface markings 1410, 1440, 1470 is illustrated, wherein FIG. 14A and FIG. 14B illustrate views of the directional surface markings 1410, 1440, 1470 from opposite directions. In some aspects, directional surface markings 1410, 1440, 1470 may be installed on a pedestrian pathway, such as a zoo. In some aspects, multiple directional surface markings 1410, 1440, 1470 may be installed on a sign post 1405 that may be placed on a pedestrian pathway, wherein the placement may allow visibility of the directional messaging 1415, 1420, 1435, 1440, 1455, 1460. For example, the system 1400 may be installed parallel at the edge of a pathway, wherein users traversing the pathway in a first direction may view a first directional message 1415, 1435, 1455, such as the directions to an Asia loop, an Africa loop, and to food. Users traversing the pathway in the opposite direction may view a second directional message 1420, 1440, 1460, such as the directions to an exit, an Australian loop, and restrooms.

Figure 18:
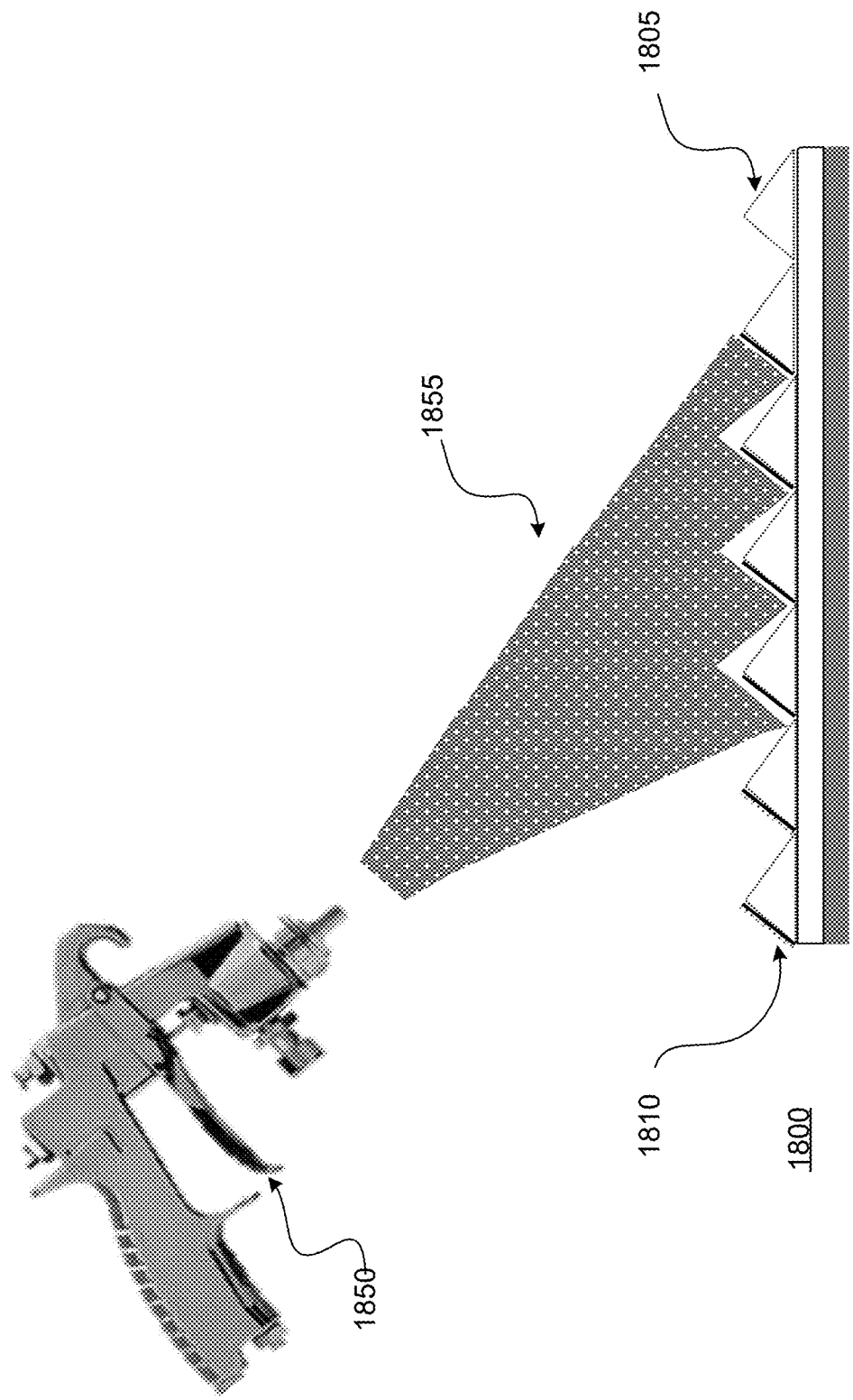
FIG. 18 illustrates an exemplary painting mechanism for applying paint to directional surface markings, wherein an application of paint to a first profile may add directional messaging

Referring now to FIG. 15A, an exemplary mold system 1500 for manufacturing directional surface markings 1520, 1530 is illustrated. In some aspects, a mold system 1500 may comprise an upper mold 1505 and a lower mold 1510. In some embodiments, the molding process may comprise pouring in a material between the upper mold 1505 and the lower mold 1510 and then curing the material until hardened. In some implementations, the cured material may be pulled from the mold system 1500 and then finished. In some aspects, finishing may comprise refining the profile layer, wherein refining may result in clean profiles. In some embodiments, the cured material may be attached to other layers, such as illustrated in FIG. 1A. In some aspects, the cured material may be coated, such as illustrated in FIG. 18.

Referring now to FIG. 15B-15C, exemplary directional surface markings 1520, 1530 are illustrated, wherein the directional surface markings 1520, 1530 may be manufactured from a mold system 1500. In some aspects, the directional surface markings 1520, 1530 may be manufactured utilizing a material that may provide a base color, wherein the base color may the intended color for at least one of the profiles of the directional surface markings 1520, 1530. In some implementations, the mold system 1500 may be set to manufacture specific sized directional surface markings 1520, 1530, such as a longitudinal directional surface marking 1530 or lateral directional surface marking 1520.

Figure 16:
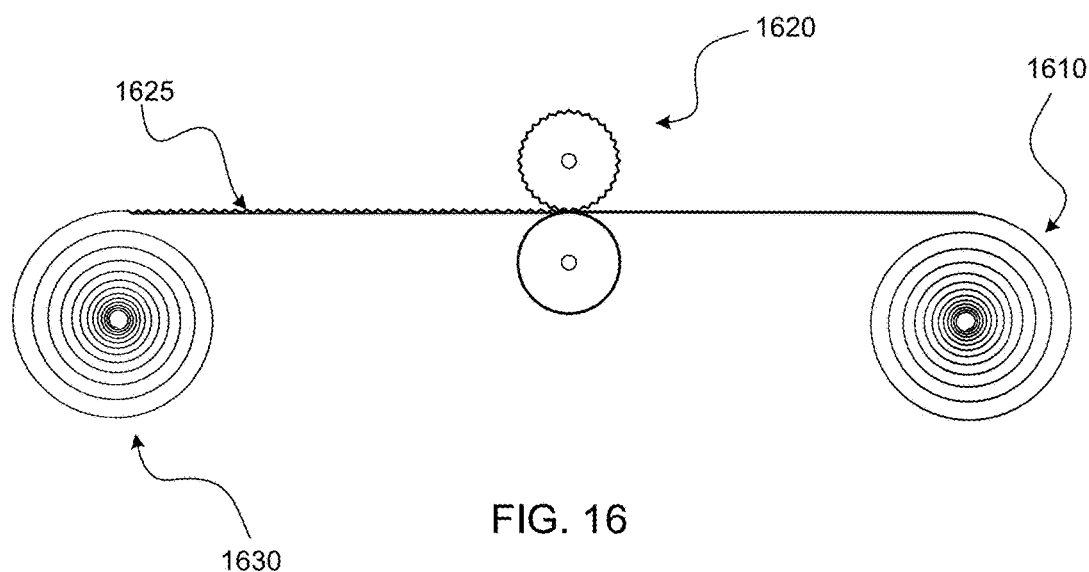
FIG. 16 illustrates an exemplary calendering system, wherein the calendering system may be used to manufacture directional surface markings.

Referring now to FIG. 16, an exemplary calendaring system 1600 is illustrated, wherein the calendering system 1600 may be used to manufacture directional surface markings. Typically, calendering is a manufacturing process of smoothing and compressing a material during production by passing a single continuous sheet 1610 through one or more pairs of heated rolls 1620, wherein the heated rolls 1620 in combination are called calenders. In some aspects, the heated rolls 1620 may be constructed of steel with a hardened surface or steel covered with fiber. In some embodiments, one of the heated rolls 1620 may comprise a profiling surface, wherein when the continuous sheet 1610 passes through the heated rolls 1620, at least one surface 1625 may comprise a profile layer. In some implementations, a processed sheet 1630 may be rolled, which may allow for customized sizing for installation.

Figure 17:
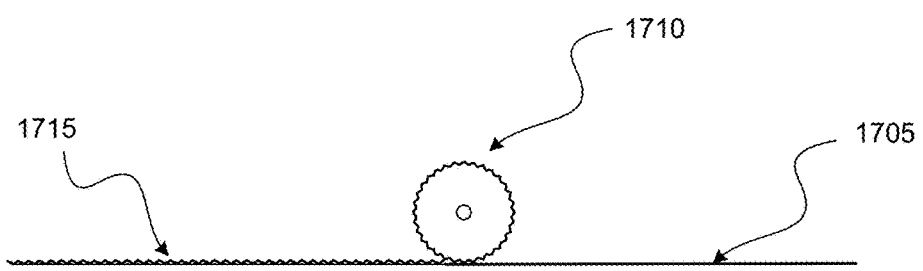
FIG. 17 illustrates an exemplary roller, wherein the roller may be used directly on a base surface to create directional surface markings.

Referring now to FIG. 17, an exemplary roller 1710 is illustrated, wherein the roller 1710 may be used directly on a base surface 1705 to create directional surface markings. In some aspects, a roller 1710 may be attached to a vehicle that may drive over the base surface 1705, wherein the roller 1710 may add one or more profiles to the base surface 1705. In some implementations, the base surface 1705 may be wet or only partially set, which may allow the roller 1710 to effectively imprint the base surface 1705 with a profile layer 1715.

Referring now to FIG. 18, an exemplary painting mechanism 1850 for applying paint 1855 to directional surface markings 1800, wherein an application of paint 1855 to a first profile 1810 may add directional messaging. In some embodiments, the painting mechanism 1850 may spray paint 1855 at a specific angle and direction, wherein an application of paint 1855 may be applied to the first profile 1810 with limited to no overspray onto a second profile 1805. In some aspects, a painting mechanism 1850 may be used to spray both profiles 1810, 1805, such as with different color paints, different directional messaging, or a coating that may be applied to both. In some aspects, the coating may be applied by spray, brush, roll, or print, as non-limiting examples.

In some implementations, directional messaging may be added through a stenciling method. In some aspects, a stencil of the directional message may comprise the same or similar material to the directional surface marking 1800, wherein the surface of the stencil may comprise opposite profiles to the directional surface marking 1800. In some embodiments, placing the stencil over the directional surface marking 1800 may limit or reduce the chance of a coating leaking, seeping, dripping, or over spraying onto the wrong profile. In some aspects, once the coating is applied, the stencil may be removed, leaving the directional message on the correct profile.

Conclusion

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combinations or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A directional surface marking device comprising:
a profile layer located parallel to a base surface, wherein a topography of the profile layer allows for at least a first directional messaging and a second directional messaging, the profile layer comprising at least:
a first profile comprising a first coating providing a first directional messaging viewable when a user traverses the base surface in a first direction, wherein at least two first profile colors convey the first directional messaging and the first directional messaging comprises one or more text or symbols, and wherein the at least two first profile colors are located on the first profile, and
a second profile comprising a second coating providing a second directional messaging viewable when a user traverses the base surface in a second direction, wherein at least one second profile color conveys the second directional messaging, and wherein the at least one second profile color is located on the second profile.

2. The directional surface marking device of claim 1, wherein at least a portion of the profile layer is integrated into the base surface.

3. The directional surface marking device of claim 1, wherein the directional surface marking device comprises a longitudinal shape, wherein a length of the directional surface marking device exceeds a width of the directional surface marking device.

4. The directional surface marking device of claim 1, wherein the directional surface marking device comprises a lateral shape, wherein a width of the directional surface marking device exceeds a length of the directional surface marking device.

5. The directional surface marking device of claim 1, further comprising a conformance layer located between base surface and the profile layer.

6. The directional surface marking device of claim 5, further comprising an adhesive layer attached to the conformance layer, wherein the adhesive layer is configured to attach to the base surface.

7. The directional surface marking device of claim 1, wherein the second coating provides a second directional messaging viewable when a user traverses the base surface in a second direction.

8. The directional surface marking device of claim 1, wherein at least a portion of the profile layer is coated in a retroreflective material.

9. The directional surface marking device of claim 1, wherein the base surface comprises a roadway.

10. The directional surface marking device of claim 9, wherein the first profile and the second profile are configured to be viewable by the user traversing the base surface in a vehicle.

11. The directional surface marking device of claim 10, wherein the first profile and the second profile are configured to be viewable by the user traversing the base surface as a pedestrian.

12. The directional surface marking device of claim 9, wherein the first directional messaging provides information related to a flow of traffic traversing the base surface.

13. The directional surface marking device of claim 9, wherein the first direction comprises a wrong direction of vehicular traffic.

14. The directional surface marking device of claim 1, wherein the base surface comprises a pedestrian walkway.

15. The directional surface marking device of claim 14, wherein the first profile and the second profile are configured to be viewable by the user traversing the base surface as a pedestrian.

16. The directional surface marking device of claim 1, further comprising a secondary alert mechanism.

17. The directional surface marking device of claim 16, wherein the secondary alert mechanism comprises a directional vibratory alert, wherein a first vibratory alert is perceptible when a user traverses the base surface in the first direction and a second vibratory alert is perceptible when a user traverses the base surface in a second direction.

18. The directional surface marking device of claim 16, wherein the secondary alert mechanism comprises a directional auditory alert, wherein a first auditory alert is perceptible when a user traverses the base surface in the first direction and a second auditory alert is perceptible when a user traverses the base surface in a second direction.

19. The directional surface marking device of claim 1, wherein the first profile comprises a first series of angles, and the second profile comprises a second series of angles.

20. The directional surface marking device of claim 1, wherein the profile layer comprises a flexible material.

* * * * *